(No Model.)
DE WANE B. SMITH.
KNIFE OR CUTTER FOR MOWERS, &c.
No. 513,834. Patented Jan. 30, 1894.
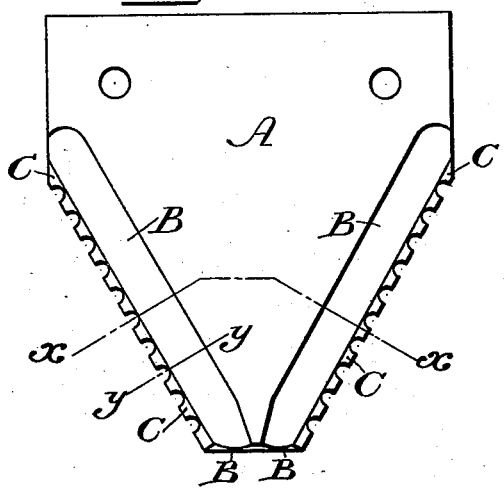
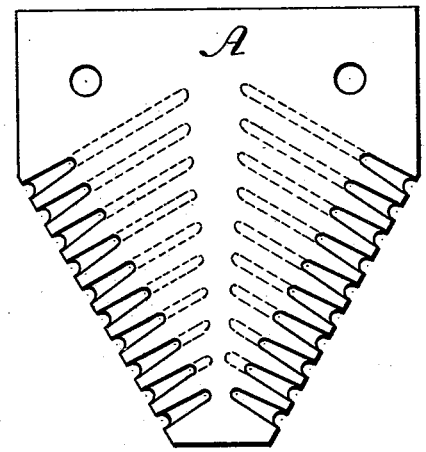
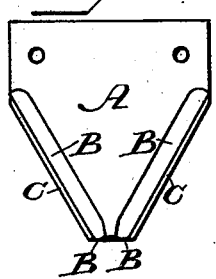
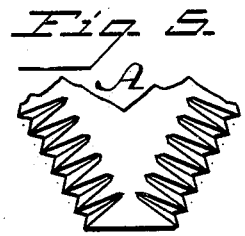
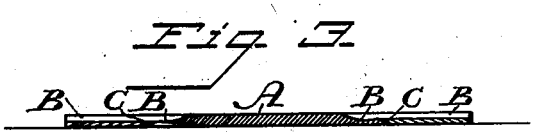
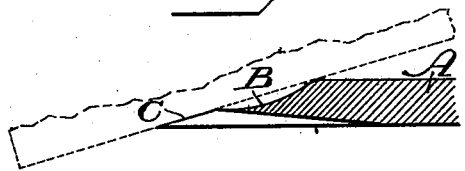
WITNESSES:
L. Douville,
Wm. C. Wiedersheim,
INVENTOR
DeWane B. Smith
BY
ATTORNEY.
THE NATIONAL LITHOGRAPHING COMPANY,
WASHINGTON, D. C.

UNITED STATES PATENT OFFICE.

DE WANE B. SMITH, OF DEERFIELD, NEW YORK.

KNIFE OR CUTTER FOR MOWERS, &c.

SPECIFICATION forming part of Letters Patent No. 513,834, dated January 30, 1894.

Application filed March 28, 1893. Serial No. 467,983. (No model.)

*To all whom it may concern:*

Be it known that I, DE WANE B. SMITH, a citizen of the United States, residing at Deerfield, in the county of Oneida, State of New York, have invented a new and useful Improvement in Knives or Cutters for Mowers, &c., which improvement is fully set forth in the following specification and accompanying drawings.

My invention consists of a knife for a mower, &c., having a channel on the same, near the cutting edge thereof, and other features, as will be hereinafter set forth.

Figures 1 and 7 represent face views of knives for mowers, &c., embodying my invention. Fig. 2 represents a view of the back of the knife shown in Fig. 1. Fig. 3 represents a section on line $x, x$, Fig. 1. Fig. 4 represents a section of a portion on line $y, y$, Fig. 1, on an enlarged scale. Fig. 5 represents a view of a portion of a knife having scallops or serrations different from those shown in Figs. 1 and 2. Figs. 6 and 8 represent sections of knives embodying my invention.

Similar letters of reference indicate corresponding parts in the several figures.

Referring to the drawings: A designates a mower knife, the same having tapering sides, and beveled on its upper face and provided with openings for connection with a cutter bar. On the upper face of the knife within the cutting edges are channels B, B, the same extending parallel with said edges, and leaving the bevel surfaces C, which extend from said edges to the outer walls of said channels. It will be seen that in sharpening the knife, the stone or sharpening device rests flat upon the bevel surfaces C, and inner walls of the channels B, and bridges over said channels, as most plainly shown in Figs. 4, 6 and 8, by which provision, as less surface of the knife is in contact with the sharpening device, the sharpening operation is performed with ease, facility, correctness and uniformity, and a sharper edge may be produced, the knife being also lighter and less expensive, owing to the saving of metal effected by the channels. The cutting edges which are in the plane of the lower face of the knife, and on said tapering sides are serrated or scalloped, when edges of such kind are required, say, for heavy work, the serrations or scallops extending into and on the back of the knife, as shown in Figs. 2 and 3, so that as the cutter edge wears away the serrations or scallops are preserved.

Having thus described my invention, what I claim as new, and desire to secure by Letters Patent, is—

1. A mower knife having a cutting edge, on the plane of one of its faces and channels in its upper face parallel with said edge, substantially as described.

2. A mower knife having a beveled cutting edge, on the plane of one of its faces and a channel on its upper face parallel with said edge, said channel being back of the inner portion of the beveled cutting edge, substantially as described.

3. A mower knife having a beveled upper edge, and a channel in rear of said edge parallel therewith, the top of the edge rear of the wall of said channel being in the plane of the beveled edge, said parts being combined substantially as described.

4. A mower knife having tapering sides with beveled upper edge, forming a cutting edge on the plane of the lower face, and provided with a channel on the upper face, parallel with and in rear of the beveled portion of said face, said cutting edge having serrations or corrugations thereon, which extend into the lower face of the knife, back of the said channel, substantially as described.

DE WANE B. SMITH.

Witnesses:
JOHN A. WIEDERSHEIM,
R. H. GRAESER.